United States Patent
Ellis

(10) Patent No.: US 8,201,274 B2
(45) Date of Patent: Jun. 19, 2012

(54) PERSONAL COMMUNICATION DEVICE

(76) Inventor: Mark Ellis, North Tuncurry (AU)

( * ) Notice: Subject to any disclaimer, the term of this patent is extended or adjusted under 35 U.S.C. 154(b) by 1120 days.

(21) Appl. No.: 10/562,077

(22) PCT Filed: Jun. 24, 2004

(86) PCT No.: PCT/AU2004/000831
§ 371 (c)(1),
(2), (4) Date: Mar. 16, 2007

(87) PCT Pub. No.: WO2004/114533
PCT Pub. Date: Dec. 29, 2004

(65) Prior Publication Data
US 2007/0289044 A1 Dec. 20, 2007

(30) Foreign Application Priority Data
Jun. 24, 2003 (AU) .................. 2003903305

(51) Int. Cl.
*A42B 1/06* (2006.01)
*A63B 71/10* (2006.01)
*H04M 1/00* (2006.01)

(52) U.S. Cl. ............... 2/410; 2/425; 455/575.2
(58) Field of Classification Search ............ 2/410, 905, 2/906, 425; 455/575.2, 575.6, 556.1, 573
See application file for complete search history.

(56) References Cited

U.S. PATENT DOCUMENTS

| | | | | |
|---|---|---|---|---|
| 4,152,553 A | * | 5/1979 | White | 379/430 |
| 4,357,711 A | * | 11/1982 | Drefko et al. | 455/90.3 |
| 4,648,131 A | * | 3/1987 | Kawaguchi et al. | 398/127 |
| 4,833,726 A | | 5/1989 | Shinoda et al. | |
| 5,119,505 A | | 6/1992 | Tisseront et al. | |
| 5,189,512 A | | 2/1993 | Cameron et al. | |
| 5,317,643 A | * | 5/1994 | Patricelli | 381/376 |
| 5,353,008 A | | 10/1994 | Eikenberry et al. | |
| 5,438,702 A | * | 8/1995 | Jackson | 455/575.2 |
| 6,009,563 A | | 1/2000 | Swanson et al. | |
| 6,157,298 A | | 12/2000 | Garfinkel et al. | |
| 6,298,249 B1 | | 10/2001 | Locarno et al. | |
| 6,406,168 B1 | * | 6/2002 | Whiting | 362/473 |
| 6,507,280 B2 | | 1/2003 | Tabata et al. | |
| 6,732,381 B1 | | 5/2004 | Lal | |
| 6,876,845 B1 | * | 4/2005 | Tabata et al. | 455/344 |
| 2002/0160723 A1 | | 10/2002 | Yagi | |
| 2004/0025230 A1 | * | 2/2004 | Rainey | 2/422 |
| 2006/0121950 A1 | * | 6/2006 | Lee | 455/569.1 |
| 2006/0293092 A1 | * | 12/2006 | Yard et al. | 455/575.2 |

FOREIGN PATENT DOCUMENTS

| | | |
|---|---|---|
| EP | 0237290 A1 | 9/1987 |
| WO | 8703501 A2 | 6/1987 |
| WO | 02071879 A1 | 9/2002 |

* cited by examiner

*Primary Examiner* — Alissa L Hoey
*Assistant Examiner* — Amber Anderson
(74) *Attorney, Agent, or Firm* — Onello & Mello, LLP

(57) ABSTRACT

The present invention provides a communication device for use in coaching and sports events. The invention includes, in one embodiment, a waterproof radio receiver embodied in a helmet.

17 Claims, 2 Drawing Sheets

PERSONAL COMMUNICATION DEVICE

FIELD OF THE INVENTION

Figure 1:
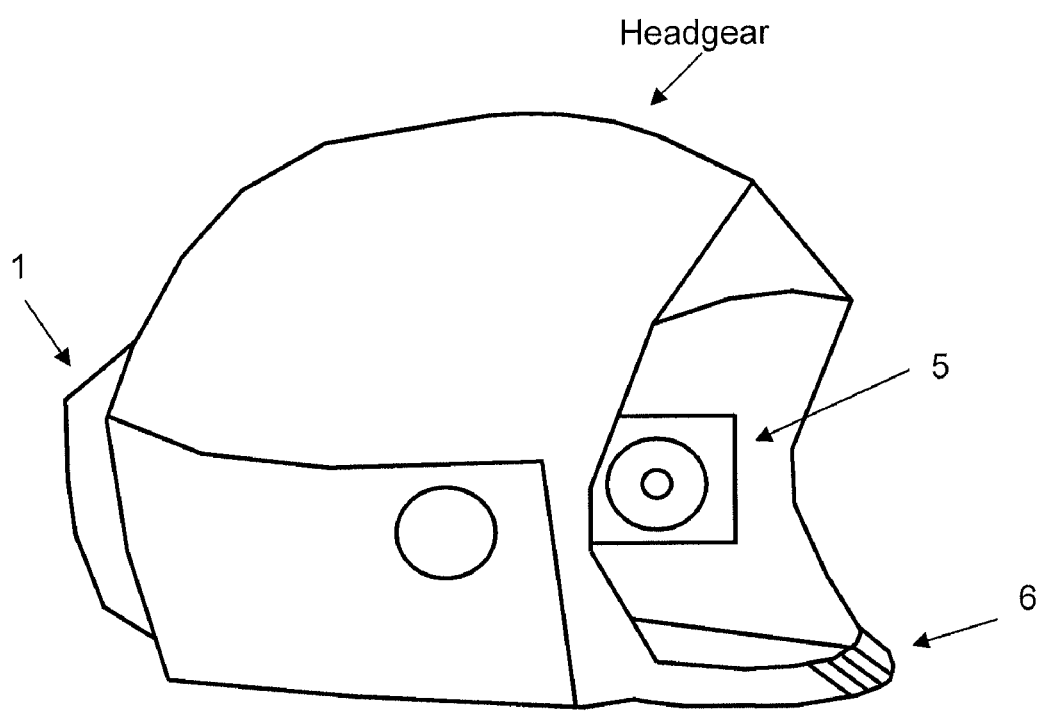

The present invention relates to a communications system and has been developed especially, but not exclusively, for use in coaching and team sports. It will be understood that the present invention may be useful in other fields, such as during rescue and/or military operations or other hazardous situations.

BACKGROUND OF THE INVENTION

When coaching a sports team or a student, it is often desirable, or necessary, for a coach to communicate instructions effectively and clearly to the sports team or student.

In some sporting activities, such as team sports that are played on an open field, unassisted verbal communication is sufficient.

In other situations, however, external factors may preclude the use of unassisted verbal communication. For example, in sports such as water skiing, surfing, sailing, or sky diving, several factors such as external noise, and/or the proximity of the coach to the student may preclude the use and effectiveness of unassisted verbal communication. In such cases, the coach may rely on visual signals to communicate with the student. Such visual signals also have shortcomings. For example, the student may misinterpret the visual signal, or may not immediately see the visual signal.

Such limitations restrict the effectiveness of the coaching, and limit the development of the student. Furthermore, in coaching situations where the instructor cannot effectively and immediately communicate with the student, the student may be placed at a higher risk of injury or misadventure.

Such considerations are also paramount in rescue operations and in many military situations. There is generally a need in many situations to communicate instructions quickly and clearly to minimise the probability of injury to the individual or maximise the effectiveness of the instructions given by the coach.

SUMMARY OF THE INVENTION

In a first aspect, the present invention provides a communications device for use in sporting activities, student coaching and other related activities, the device comprising,
  a radio signal receiver and an associated power source arranged to receive radio signals from a transmission source and convert the radio signals into an audio signal reproduced on at least one audio speaker,
  the radio receiver being enclosed within a helmet to form a self-contained unit whereby the ingress of undesirable contaminants into the receiver is prevented,
  wherein the helmet is wearable by a user to allow the user to receive the audio signals, whilst affording the user at least some protection from injury.

In at least a preferred embodiment, the present invention advantageously allows the user to receive verbal instructions without the need to hold a communications device in their hands or clipped to an item of clothing. Such a feature is particularly important in sports such as rock climbing, water skiing, or sky diving, where the user cannot operate a handheld communication device, since they generally do not have any "free" hands while participating in the sport or activity.

The user is capable of receiving appropriate instructions, whilst not interfering with the user's safety and/or comfort.

Furthermore, a device in accordance with at least a preferred embodiment of the present invention may advantageously be utilised in environments where conventional communications devices cannot be utilised. This includes applications at sea or in other locations where water ingress may be an issue, in dusty or muddy conditions, where conventional two-way radios may be rendered inoperable due to environmental hazards, or in situations where the user cannot operate conventional radios due to the need to perform other tasks simultaneously (e.g. during water skiing, rock climbing, abseiling, during sea or land rescues, etc).

The radio receiver may be enclosed in a resin or foam-like substance.

The power source may be rechargeable.

The power source may be a rechargeable battery which is enclosed within the self-contained unit.

The radio signal receiver may be located at a rear portion of the helmet.

The radio signals may be transmitted in the UHF frequency band.

Radio receiver controls may be contained within the self-contained unit.

The radio receiver controls may be operated by the application of an appropriate electromagnetic field.

The radio receiver controls may be operated by the use of infra-red signals, radio signals or the application of a magnetic field.

The rechargeable power source may be recharged by magnetic induction.

The device may further include a radio transmitter capable of transmitting a signal to the transmission source.

The device may further include a microphone capable of capturing audio signals which are provided to the radio transmitter for transmission to the transmission source.

In a second aspect, the present invention provides a method of coaching a student, comprising the steps of,
  the student wearing a helmet in accordance with a first aspect of the invention, and
  the coach providing verbal instructions to the student via a radio transmitter capable of relaying instructions to the helmet worn by the student.

DETAILED DESCRIPTION OF THE DRAWINGS

Figure 2:
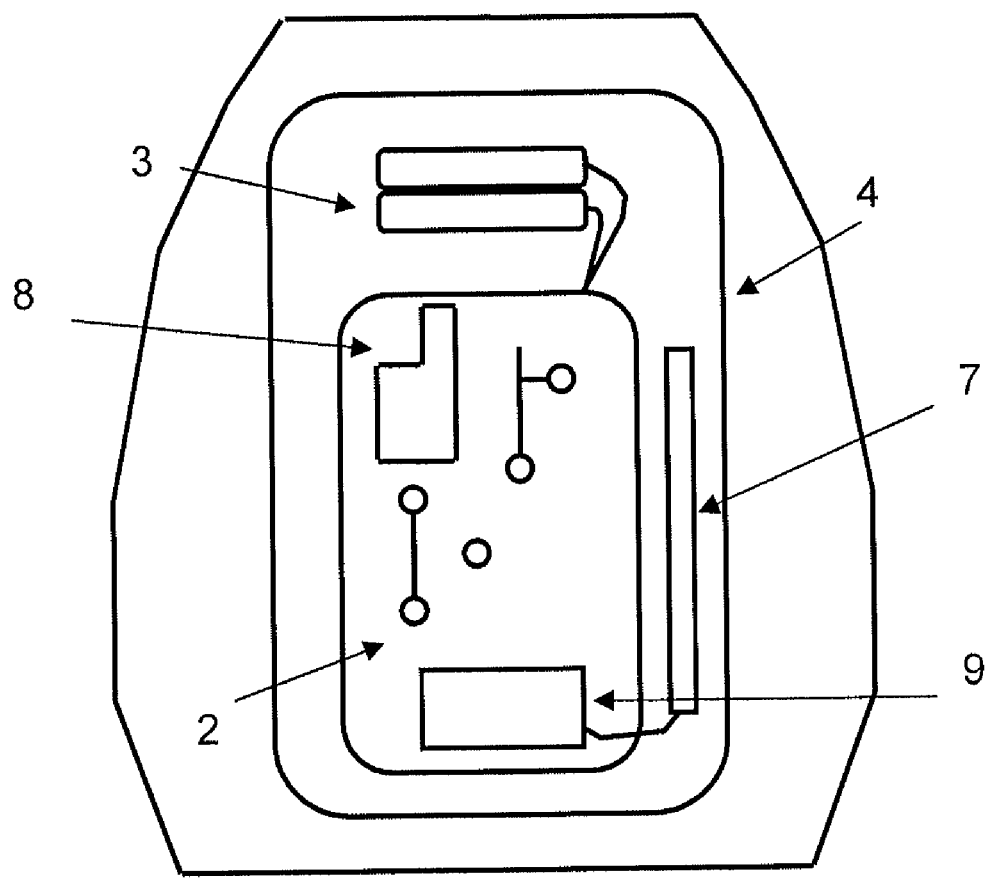

Features and advantages of the present invention will become apparent from the following description of an embodiment thereof, by way of example only, with reference to the accompanying diagrams, in which:

FIG. 1 is a perspective view of a device in accordance with an embodiment of the present invention; and FIG. 2 is a view of the electronic circuitry used in the device in accordance with an embodiment of the present invention.

DESCRIPTION OF THE PREFERRED EMBODIMENT

An embodiment of the present invention provides a communication device for use in coaching individuals. However, the communication device may be used in any other situation where a first person is required to relay an instruction or warning message to a second person or persons, particularly in a situation where standard verbal or visual communication is not appropriate or effective.

An embodiment of the device, as shown in FIGS. 1 and 2, comprises a housing 1 arranged to hold appropriate electronic circuitry 2, the circuitry being arranged to act as a radio signal transceiver 9, which comprises a radio receiver. The circuitry 2, in one embodiment, is arranged to receive radio signals in the UHF (ultra high frequency) band. For example, in one embodiment of the invention, a receiver circuit extracted from a Uniden™ UH037 hand-held UHF radio receiver is used as the radio signal receiver. However, it will be understood that any appropriate radio signal receiver circuit may be employed in the device. In addition, a radio antenna 7 can be connected to the radio transceiver 9. The receiver may be arranged to switch between "channels" in the UHF range, such that the device does not interfere with other proximate devices which operate in a similar or identical UHF frequency band. It will be understood that whilst a preferred embodiment of the present invention operates in the UHF band, the device may be modified to receive any appropriate radio signals, as required by local laws and regulations or for technical reasons (such as the need to communicate on a different portion of the radio frequency spectrum due to "crowding" of a particular frequency band).

The device also preferably includes a power source 3 arranged to power the radio circuitry 2. In a preferred embodiment, the power source 3 takes the form of rechargeable batteries that may be recharged by an inductive method (or any other suitable method). Inductive charging is the preferred method of charging, as no electrical terminals need be exposed to perform recharging of the battery.

In another embodiment, the power source 3 may be recharged via two terminals that are exposed. Corrosion of the recharging terminals may be substantially avoided by electrically "uncoupling" the terminals via a magnetic switch (the magnetic switch will be described in more detail hereinbelow).

In an alternate embodiment, a waterproof connection such as a waterproof "BNC" plug with a cooperating sealing cap may be provided for charging the power source.

The electronic circuitry 2 and the power source 3 are, once assembled, encased in a resin or plastic-like substance 4 (see FIG. 2). The encasing is performed, in one embodiment, by placing the assembled circuit in a mould, and pouring a plastics or resin compound into the mould. The plastics or resin compound is allowed to set, forming a solid self-contained unit or "block", which effectively traps and seals the electronic circuitry therein. The block is subsequently removed from the mould. By encasing the circuitry and the power source in the resin or plastics substance, the electronic circuitry and the power source are shielded from degradation due to external environmental hazards, such as water, dust or other undesirable substances which can affect electronic circuitry. That is, the device is rendered waterproof and dustproof, so that it may operate in harsh environments, such as when a user is near or in water, in wet weather, in snow, or in dusty or dirty environments such as in a desert.

Encasing the circuitry in resin also provides a measure of shock absorption to prevent the device from becoming damaged by a heavy impact, as an appropriate resin (i.e. a resin with appropriate chemical and mechanical properties) may be chosen such that the device is capable of absorbing a portion of the force of an impact, thereby preventing damage to the electronic circuitry.

Different resins may be chosen according to desired mechanical and chemical properties. For example, a particularly elastic resin may be chosen if the device is to be used in a situation where the likelihood and frequency of impact is high. Alternately, in a situation where the likelihood of impact is low and total manufacture cost is an issue, a less expensive resin with fewer desirable properties may be utilised. The appropriate choice of resin as may be required for a particular application is within the scope of a person skilled in the art.

In an alternate embodiment, the electronic circuitry is encased in a non-porous and shock absorbing "foam". The foam performs the same function as the resin (i.e. the foam isolates the circuitry from water and other undesirable substances) whilst simultaneously providing a measure of shock protection. In one embodiment, a "closed cell injection foam" is utilised to encase the radio receiver in a cavity in a helmet. The closed cell injection foam is suitable for this purpose, as it provides a waterproof seal, whilst providing a level of shock protection for both the radio signal receiver and the user who wears the helmet.

The electronic controls 8 (such as the volume control, the on/off switch, the channel selector and any other controls required to operate the radio device) are also encased in the plastics, resin or foam-like substance, such that the controls cannot be contaminated by external elements. By encasing the electronic controls in resin, the likelihood of inadvertently providing a "weakened zone" through which water or dirt may enter the circuitry is lessened.

Furthermore, as the controls are not exposed, the possibility of a user inadvertently disabling the device, varying the device settings or otherwise tampering with the device is lessened. Moreover, as no controls protrude from the device, the probability of the controls becoming damaged in a collision or impact is also lessened.

The electronic controls are operated remotely via an external device. The external device may use infra-red signals, radio frequency signals or magnetic field means to operate the controls of the device. In one embodiment, the controls are operated via a magnetic switch. That is, a small earth magnet is used to toggle the controls of the device. The switch is toggled by passing the magnet over a zone of the device where the appropriate switch or control is located. Such a switch is generally termed a "reed switch" in the art.

If infra-red signals are to be used, then a plastics, resin or foam-like substance which is optically clear in the infra-red range is used to encase the electronic circuitry and the power source.

In an alternate embodiment, the power source and the electronic circuitry may be encased in separate packages, and may be joined together by any suitable electric connection.

The circuitry, once encased in the resin block, is placed in a cavity or integral housing located within a helmet. In an embodiment where the housing is initially separate to the helmet, the integration of the housing may be achieved by attaching the housing to existing headgear utilising any appropriate means, such as plastic welding, the use of epoxy glue or other adhesives, or by fixing the housing to the headgear using any appropriate fixing means, such as recessed bolts or rivets.

The device further comprises a pair of audio speakers 5 arranged at a location within the headgear, such that the audio speakers 5 are substantially aligned with the ears of the user. The audio speakers 5 are connected to the radio signal receiver 9. The audio speakers 5 are located within the helmet to provide a level of protection from environmental elements, such as water ingress. The audio speakers 5 may also be of a waterproof design, or at the very least, a design which withstands immersion in water. That is, the audio speakers 5 must generally be of a plastic construction, (including the cone) rather than a coated paper construction, and must preferably have few exposed metal parts.

In the preferred embodiment, the headgear is a helmet that is lightweight and provides a "snug" fit. The helmet, as provided in the preferred embodiment, is designed to protect against head injuries caused by glancing blows, rather than providing protection against serious impact. The helmet is preferably lightweight and of a streamlined shape to reduce the probability of the user sustaining a neck injury when penetrating air, water or snow at high speed.

The helmet will generally be of an appropriate standard for use in a chosen sport. For example, in a sport such as water skiing, the helmet may be an "OVO" helmet (produced by OVO USA, LLC, located at 47 Harvard Street Worcester, Mass. 01609, USA).

The device will preferably be located on the helmet at a position where some natural protection from environmental hazards is afforded. For example, the device may generally be attached or located at the rear of the helmet or at the top of the helmet. Furthermore, as some embodiments of the present invention are arranged for use in competitive sports, the device may preferably be attached at a location on the helmet which minimises the risk of possible neck strain incurred due to extra weight or an altered weight distribution caused by the introduction of the radio receiver.

The helmet may also be a "crash" helmet. Such a helmet may be appropriate in other sports, such as rock climbing, motor cycle racing, or in rescue or military applications.

The helmet may incorporate other subsidiary features, such as lights, visors, a beacon device or any other device that assists the user or protects the user from accidental injury. For example, for rock/mountain climbing or caving, the helmet may include a light arranged to illuminate the path of the user. Alternately, in situations such as cross-country skiing, the helmet may include a beacon arranged to emit a visual or audible signal to assist rescue crews, should the user encounter trouble or injure themselves.

The helmet advantageously allows the user to receive verbal instructions without the need to hold a communications device in their hands. Such a feature is particularly important in sports such as rock climbing, water skiing, or sky diving, where the user cannot operate a hand-held communication device, since they generally do not have any "free" hands while participating in the sport.

In many sports, the use of a communications device which incorporates a conventional pair of headphones (or other similar devices) is cumbersome and not always practical, due to the need to wear protective headgear. A device in accordance with an embodiment of the present invention allows the user to receive appropriate instructions, whilst not interfering with the user's safety and/or comfort. Furthermore, conventional radio devices are generally not waterproof, and prior art devices generally need to be carried in a holster or clipped to a belt or other piece of clothing. Such an arrangement is sub-optimal, as the device may break free or become damaged when exposed t harsh environmental conditions.

Furthermore, a device in accordance with an embodiment of the present invention may advantageously be utilised in environments where conventional communications devices cannot be utilised. This includes applications at sea or in other locations where water ingress may be an issue, in dusty or muddy conditions, where conventional two-way radios may be rendered inoperable due to environmental hazards, or in situations where the user cannot operate conventional radios due to the need to perform other tasks simultaneously (e.g. water skiing, rock climbing, abseiling, during sea or land rescues, etc).

In an alternate embodiment, the radio transceiver 9 further includes a radio transmission device arranged to transmit an audio signal. The audio signal is received from a microphone 6 that is embedded into a location of the helmet that, in use, locates the microphone near the user's mouth. The alternate embodiment allows a user to relay information to the coach, instructor or another user. Such a preferable feature is particularly useful in high noise situations or situations where instructions given by the instructor are not clear, or where the user requires further information. In such situations, the radio transmission device allows the user to provide instant feedback to the instructor.

The microphone 6 is of a waterproof variety that is substantially impervious to the ingress of water and other environmental contaminants.

It will be understood that a plurality of communications devices in accordance with an embodiment of the present invention may be utilised concurrently to allow a coach to relay instructions to a number of students at once.

Moreover, it is within the scope of the invention to construct a "coaches" helmet that allows a coach to relay instructions while participating in a sporting activity. In some applications of an embodiment of the present invention, however, the coach may communicate with the student or students by using a conventional hand-held UHF "walkie-talkie".

In use, an embodiment of the present invention allows a coach to provide instantaneous instructions to a student. Such a system radically alters the manner in which a coach instructs and teaches the student. In the past, especially in sports where instantaneous coaching was not practicable, the coach was required to give a student an instruction, wait for the student to perform the task, then stop the student and explain the error or problem/s with the student's technique.

For example, in the sport of waterskiing, a student is generally coached in the following manner. A technique or manoeuvre is explained to the student by the coach while the student and the instructor are on land or in a boat. The student is then taken out onto the water (i.e. towed behind the boat) and attempts to perform the technique or manoeuvre under the supervision of the coach. Once the student performs the technique or manoeuvre, the boat is slowed or stopped and the student and the coach discuss any errors or problems with the student's technique. Such a system is inefficient, as it requires much iteration before the student corrects their technique. The experience can become frustrating for both the student and the coach.

In other words, the current coaching system is inefficient because instant communication is not possible, and therefore, instant correction by the coach of any errors made by the student is not possible. In at least a preferred embodiment, the present invention allows a coach to issue corrective instructions almost instantaneously to the student, which is important in sports such as waterskiing. In this way, the coaching can be constant, consistent, and therefore more efficient. As a corollary, the student also achieves a sense of fulfillment, as they learn manoeuvres more rapidly and can instantaneously see the improvement in their technique since they receive corrective instructions whilst they are performing the manoeuvre.

The invention claimed is:

1. A land and water rescue, sports, and training helmet, comprising:
    waterproof audio speakers integrated into an interior of the helmet;
    a waterproof microphone;
    an antenna; and
    a waterproof housing, resin-filled to encase electronic elements comprising:
        at least one externally rechargeable battery;
        an electronic control device including electronic controls embedded within the resin and externally actuated, the electronic controls including an on/off control, a volume control, and a channel selector control, wherein the electronic control device comprises at least one magnetic switch that is toggled via a magnetic field from a magnet passed over a zone of the waterproof housing containing the magnetic switch; and a radio signal communication device including a receiver connected to the antenna and constructed and arranged to receive radio signals and convert the received radio signals into an audible sound reproduced by the waterproof audio speakers, wherein the receiver is configured to communicate directly with a hand-held communication device.

2. The helmet of claim 1, wherein at least one of the electronic controls of the electronic control device is operated by at least one communication type selected from a group consisting of: infra-red communication and radio communication.

3. The helmet of claim 1, wherein the waterproof housing is located at a rear portion of the helmet.

4. The helmet of claim 1, wherein the radio signal communication device communicates in a UHF frequency band.

5. The sports and training helmet of claim 1, wherein the waterproof substantially impervious to the ingress of water and other environmental contaminants.

6. The sports and training helmet of claim 1, wherein the at least one magnetic switch is a reed switch.

7. The training helmet of claim 1, wherein the at least one magnetic switch is a hall effect sensor.

8. The helmet of claim 1, wherein the at least one externally rechargeable battery is at least one inductively rechargeable battery.

9. The helmet of claim 1, the radio signal communication device further including a transmitter configured to transmit audio signals to the hand-held communication device.

10. The helmet of claim 1, wherein the antenna is also encased in the resin-filled housing.

11. A waterproof land and water rescue, sports, and training helmet, comprising:

at least one waterproof audio speaker integrated into an interior of the helmet;

a waterproof audio microphone; and a self-contained waterproof unit integrated into a rear portion of the helmet, the self-contained waterproof unit filled with a non-porous, shock absorbing material encasing electronic circuitry comprising:

an inductively rechargeable power source;

a radio signal receiver constructed and arranged to receive radio signals, wherein the radio signal receiver is electrically connected to the at least one waterproof audio speaker, the waterproof audio microphone and the inductively rechargeable power source, and wherein the radio signal receiver is configured to communicate with a hand-held communication device; and an electronic control device including externally actuated electronic controls including an on/off control, a volume control and a channel selector control, wherein the electronic control device further comprises at least one magnetic switch for controlling the on/off control, the volume control and the channel selector control, wherein the at least one magnetic switch is toggled via a magnetic field from a magnet passed over a zone of the self-contained waterproof unit containing the magnetic switch.

12. The waterproof helmet of claim 11, wherein the non-porous, shock absorbing material is at least one material selected from a group consisting of plastics, resins and foam-like substances.

13. The waterproof sports and training helmet of claim 11, wherein the at least one magnetic switch is a reed switch.

14. The waterproof helmet of claim 11, wherein the at least one magnetic switch is a hall effect sensor.

15. The waterproof helmet of claim 11, the electronic circuitry further comprising a radio signal transmitter configured to transmit audio signals to the hand-held communication device.

16. The waterproof helmet of claim 15, wherein at least one of the radio signal receiver and transmitter communicates directly with the hand-held communication device.

17. The waterproof helmet of claim 11, further comprising an antenna also encased in the non-porous, shock absorbing material.

* * * * *